United States Patent
Dray, Sr.

(10) Patent No.: US 10,350,809 B2
(45) Date of Patent: Jul. 16, 2019

(54) PLASTIC PROCESSING SCREW

(71) Applicant: Robert F. Dray, Sr., Dallas, TX (US)

(72) Inventor: Robert F. Dray, Sr., Dallas, TX (US)

( * ) Notice: Subject to any disclaimer, the term of this patent is extended or adjusted under 35 U.S.C. 154(b) by 445 days.

(21) Appl. No.: 15/134,768

(22) Filed: Apr. 21, 2016

(65) Prior Publication Data

US 2017/0305057 A1    Oct. 26, 2017

(51) Int. Cl.
| | |
|---|---|
| *B29C 48/56* | (2019.01) |
| *B29B 7/42* | (2006.01) |
| *B29C 48/54* | (2019.01) |
| *B29C 48/55* | (2019.01) |
| *B29C 48/395* | (2019.01) |
| *B29C 48/16* | (2019.01) |
| *B29C 48/565* | (2019.01) |

(52) U.S. Cl.
CPC .............. *B29C 48/56* (2019.02); *B29B 7/42* (2013.01); *B29B 7/429* (2013.01); *B29C 48/54* (2019.02); *B29C 48/55* (2019.02); *B29C 48/16* (2019.02); *B29C 48/397* (2019.02); *B29C 48/565* (2019.02)

(58) Field of Classification Search
CPC ... B29C 47/605; B29C 47/6043; B29C 48/56; B29C 48/55; B29C 48/54; B29C 48/16; B29C 48/397; B29C 48/565; B29B 7/42; B29B 7/429
See application file for complete search history.

(56) References Cited

U.S. PATENT DOCUMENTS

| | | | |
|---|---|---|---|
| 3,701,512 A | 10/1972 | Hensen et al. | |
| 3,870,284 A | 3/1975 | Kruder | |
| 4,173,417 A | 11/1979 | Kruder | |
| 4,277,182 A | 7/1981 | Kruder | |
| 4,356,140 A | 10/1982 | Kruder | |
| 4,444,507 A * | 4/1984 | Dray | B29C 47/60 366/319 |
| 4,842,414 A | 6/1989 | Dray | |
| 5,035,509 A | 7/1991 | Kruder | |
| 5,798,077 A * | 8/1998 | Womer | B29C 47/6081 264/176.1 |
| 6,056,430 A | 5/2000 | Medici et al. | |
| 6,132,075 A | 10/2000 | Medici et al. | |
| 6,599,004 B2 | 7/2003 | Barr | |
| 6,672,753 B1 | 1/2004 | Womer et al. | |
| 6,988,821 B2 | 1/2006 | Dray | |
| 2011/0222363 A1* | 9/2011 | Mazzocca | B29B 7/421 366/81 |

* cited by examiner

*Primary Examiner* — Anshu Bhatia
(74) *Attorney, Agent, or Firm* — Mark D. Perdue

(57) ABSTRACT

An improved screw has a shaft having a surface and a central axis and at least one flight extending helically along the surface of the shaft in successive turns. A continuous groove is formed in the surface of the shaft and extends between successive, pushing and trailing, turns of the flight at a selected angle greater than zero. The groove defines at least one generally triangular land having a base aligned with a pushing turn of the flight and an apex between successive turns of the flight. The groove also defines another generally triangular land having a base aligned with a trailing turn of the flight. Barriers or dams may be provided on the lands and in the grooves. A second continuous groove may also be formed in the surface of the shaft.

19 Claims, 2 Drawing Sheets

PLASTIC PROCESSING SCREW

BACKGROUND OF THE INVENTION

Field of the Invention

The present invention relates generally to the flighted screws used in injection-molding, extrusion, and similar apparatus. More particularly, the present invention relates to improvements in such screws to increase their versatility by increasing the number of polymer formulations the screw is capable of optimally processing.

Summary of the Prior Art

In injection-molding and extrusion of polymer or plastic resin (the terms "plastic" and "polymer" are used herein synonymously and interchangeably) material, a feed screw with a helical flight or flights on its outer surface rotates in a heated containment barrel. Plastic pellets are fed into the apparatus at one end and the application of heat, friction, and shear forces to the pellets melts and mixes the pellets into a polymer shot (or volume) suitable for injection. The screw then is reciprocated (moved forward), closing a non-return valve, and acts as a plunger to inject the shot of plastic into a mold.

In injection molding (and to a lesser extent, extrusion) a wide variety of plastic formulations may be processed using the same injection molding apparatus. There are numerous screw designs adapted to achieve various characteristics during melting and mixing. Different screws may be used that are optimized for the particular plastic formulation being processed. The suitability (or lack thereof) of a particular screw design for the particular plastic formulation it processes can have significant impact on the quality of the resulting part and the defect rate in manufacturing those parts.

A need exists for screw designs that maximize the versatility of the screw for use with various plastic formulations.

SUMMARY OF THE INVENTION

It is a general object of the present invention to provide a plastic processing screw that may be configured for use with various plastic formulations.

This and other objects of the present invention are achieved by an improved screw comprising a shaft having a surface and a central axis and at least one flight extending helically along the surface of the shaft in successive turns. A continuous groove is formed in the surface of the shaft and extends between successive, pushing and trailing, turns of the flight at a selected angle greater than zero. The groove defines at least one generally triangular land having a base aligned with a pushing turn of the flight and an apex between successive turns of the flight. The groove also defines another generally triangular land having a base aligned with a trailing turn of the flight.

According to an embodiment of the invention, a generally oblong barrier member is disposed on one of the land and the groove in general alignment with the central axis of the screw.

According to one embodiment of the invention, the barrier member is disposed on and projects above the land.

According to another embodiment of the invention, the barrier member is disposed in and projects from the bottom of the groove.

According to still another embodiment of the invention, the groove defines a plurality of generally triangular lands and a pair of barrier member is associated with each land, one of the pair of barrier members disposed on each of the lands and another of the pair of barrier members in the groove, each of the pair of barrier members aligned with one another and with the central axis of the screw.

According to an embodiment of the invention, the barrier members are removable and adjustable in projection above the land and groove, respectively.

According to another embodiment of the invention, the selected angle is 45 degrees.

According to a further embodiment of the invention, a second continuous groove is formed in the surface of the shaft and extends between successive turns of the flight at a selected angle greater than zero relative to an adjacent turn of the flight in alternating generally opposing directions and intersects the first groove to define central lands.

Other objects, features, and advantages of the invention will become apparent with reference to the drawings and the detailed description, which follow.

DETAILED DESCRIPTION OF THE INVENTION

Figure 1:
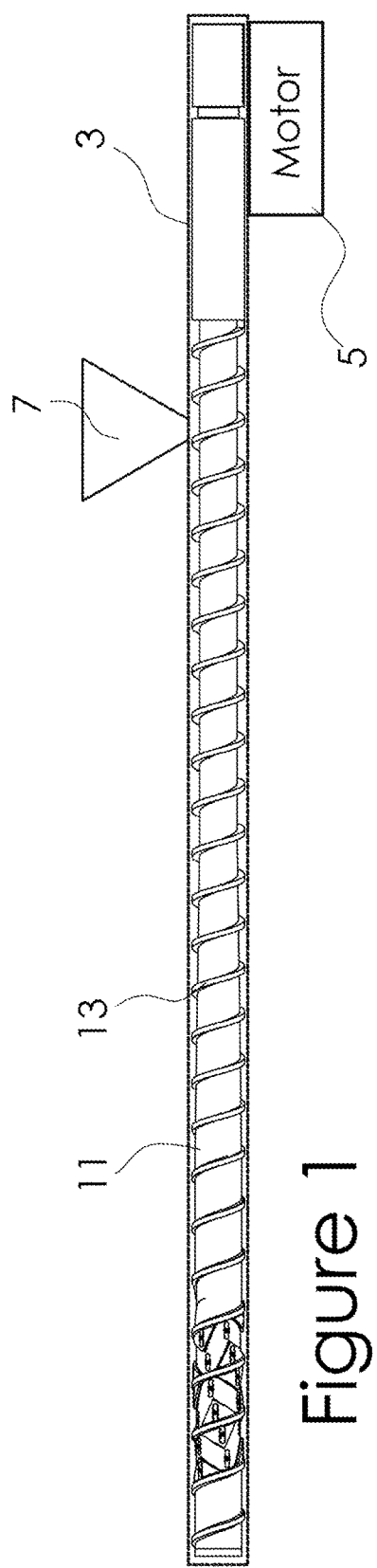
FIG. 1 is a schematic depiction of an injection-molding apparatus using a screw in accordance with the present invention.

Referring now to the Figures, and particularly to FIG. 1, a schematic depiction of an injection-molding or extrusion apparatus 1 of the type contemplated in the present invention is illustrated. Apparatus 1 comprises a heated containment barrel 3, a motor 5, and a feed hopper 7. A flighted screw 11 is rotated by motor 5 in containment barrel 3. Plastic or polymer pellets are fed into barrel 3 from hopper 7. Rotation of screw 11 in barrel 3, combined with the application of heat from electric (resistance) heaters in barrel, melts and mixes the plastic pellets together. Screw 11 may also be coupled to a hydraulic ram (not shown), which reciprocates screw 11 to close a non-return valve and, acting as a plunger, discharge or inject a shot or volume of mixed and melted plastic into a mold (not shown). If configured for extrusion, no ram is present and pressure generated by the screw is used to move the melted and mixed plastic to an extrusion die or in combination with other extrusion screws, as for coextrusion. Some extrusion apparatus employ two or more screws co-acting with one another in a non-cylindrical barrel to mix and melt resin and force it into a die. The present invention is intended for use in the illustrated single screw rotating in a generally cylindrical barrel configuration.

Screw 11 is conceptually divided into three sections: a feed section comprising approximately ⅓ of the screw to the right in FIG. 1, under feed hopper 7; a mixing or transition section comprising approximately the middle ⅓ of the screw; and a discharge or metering section comprising approximately ⅓ of the screw to the left in FIG. 1, adjacent or proximal the discharge end of apparatus 1. As shown in greater detail in FIG. 2, at least one helical flight 13 is machined into the surface of screw 11. Flight 13 is circular in cross-section and typically extends continuously along the length of screw 11 in successive helical turns around the diameter of the shaft of screw 11 at a selected fixed or variable lead (distance between successive turns of the flight). Outermost diameter of flight 13 is selected to provide approximately 0.001 inch per inch of diameter clearance between the outer diameter of flight 13 and the inner diameter of barrel 3. It is conventional to vary the depth of the channel between turns of flight 13 along the length of screw 11. It is also conventional to vary the lead of flight 13 along the length of screw 11, or to provide a secondary flight, or combinations of both. If a secondary flight is used, the channel may be defined between successive turns of the primary and secondary flights, rather than turns of a single flight. In considering a "pair" of successive turns of flight 13, the upstream turn is referred to as the "pushing" side or turn of the flight, while the succeeding adjacent downstream turn is referred to as the "trailing" side or turn of the flight. In a configuration having multiple flights, the pushing and trailing successive turns may be turns of the primary and secondary flight, rather than of a single flight.

Figure 2:
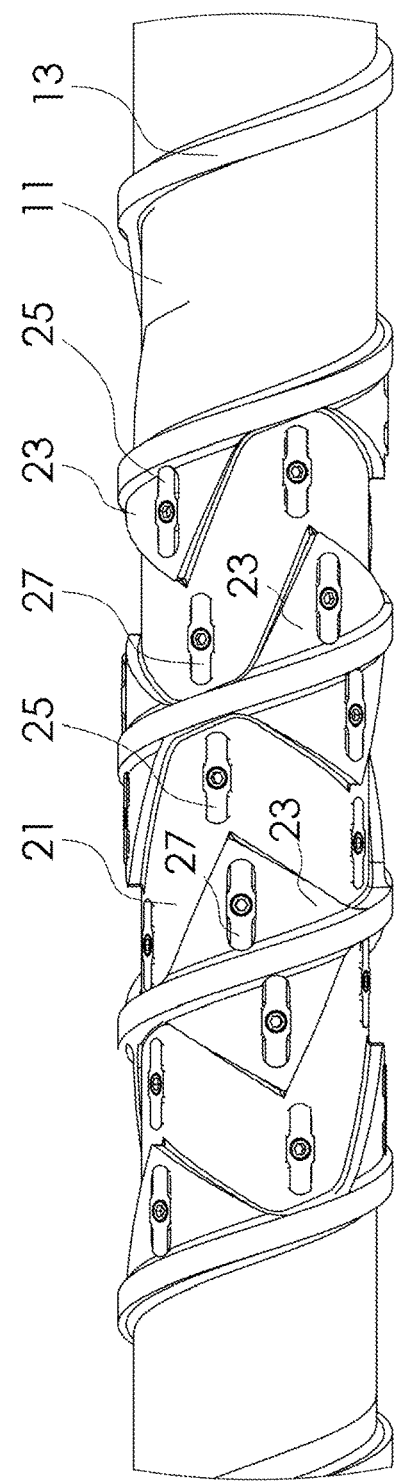
FIG. 2 is an enlarged view of a portion of the screw illustrated in FIG. 1.
Figure 3:
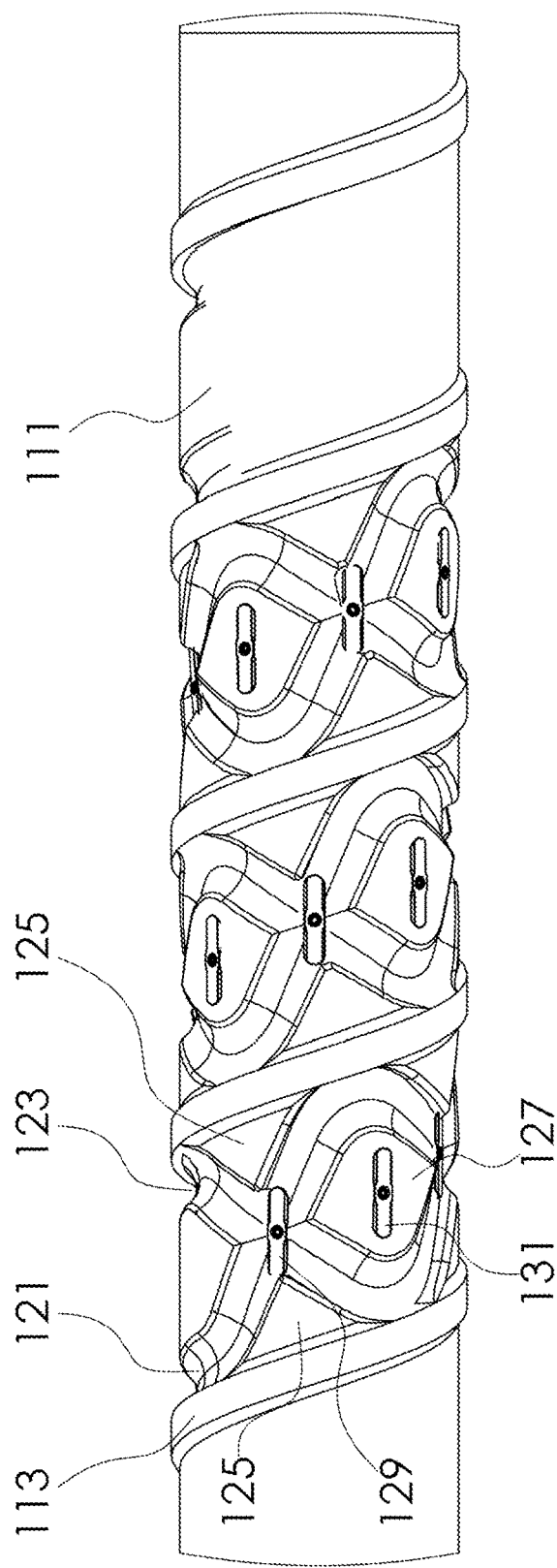
FIG. 3 is an enlarged view of a portion of a screw similar to that depicted in FIGS. 1 and 2 illustrating another embodiment of the invention.

In the metering section of screw 11, a groove 21 may be cut or formed in the channel between successive turns of flight 13. Groove 21 alternates direction between turns of flight 13 in a zig-zag fashion, preferably extending at a selected angle of +/−45 degrees relative to the central axis of screw 11. As shown, groove 21 defines a series of generally triangular lands 23 that have their bases aligned with and intersecting (actually integral with) flight 13 and have their apices extending into groove 21. As used herein, a "land" is raised relative to or projects above a groove so that at least its upper surface is raised relative to the bottom or lowest surface of the groove, which is recessed relative to the land, as shown in FIGS. 2 and 3. Also, generally triangular lands 23 are formed or defined abutting both the upstream or pushing side and the downstream or trailing side of flight 13. In the illustrative embodiment, groove 21 is formed such that lands 23 are triangular with a sharp apex or vertex and sharp intersections with flight 13. Groove 21 may also be formed in a more curved or sinusoidal fashion, creating lands 23 with more rounded apices or vertices and more curved intersections with flight 13. The term "generally triangular" is intended to encompass these variations. Groove 23 should alternate or change direction between turns of flight 13 and lands 23 will accordingly have a converging/diverging, generally triangular shape.

A barrier or dam member may be located in the channel, preferably with one land barrier 25 on each land 23 and one groove barrier 27 in groove 21. Barriers 25, 27 are generally oblong in shape with semi-circular or rounded ends to promote flow around them and avoid stagnation points. Although "pairs" of barriers associated with each land 23 (one land barrier 25 and one groove barrier 27 for each land 23) are illustrated and preferred, varying combinations of barriers 25, 27 and lands 23 are contemplated by the invention. Each barrier is secured in a correspondingly shaped aperture in the shaft of screw 11 by a machine screw. Barriers 25, 27 are removable as described in commonly invented and owned U.S. Pat. No. 6,988,821.

The relative height or projection of land barrier 25 above land 23 and of groove barrier 27 into groove 21 is adjustable by adjusting the height of the barriers themselves or by shimming them in their apertures. Barriers can also be "flush" with the top of lands 23 or bottom of groove 21, giving the effect of no barrier at all; or some may be omitted entirely (with an attendant loss of flexibility in the design). Barriers 25, 27 have their longitudinal axes parallel or aligned with the central axis of screw 11 and aligned with the apex of each corresponding triangular land 32, such that barriers extend transversely across the path of melted/melting resin through the channel between turns of flight 13. Preferably, there are pairs of barriers 25, 27 associated with each land 23 and the groove area in the vicinity of its apex, but barriers may be omitted in alternating or other fashion on top of lands 23 or in groove 21.

FIG. 3 depicts another embodiment of screw 111 in accordance with the invention. In this embodiment, a first 121 and a second 123 continuous grooves alternate direction (zig zag) in the channel or between turns of the flight 113. First and second grooves 121, 123 also extend circumferentially about the surface of the shaft more than one turn of flight 113. In this embodiment, generally triangular lands 125 are also defined with their bases aligned or intersecting the pushing and trailing turns of flight 113 and their apices projecting into the channel between the turns of flight 113. The intersections of grooves 121, 123 also define central lands 127 that are diamond-shaped.

In this embodiment, no barrier members or dams are provided on triangular lands 125. However, groove barrier members 129 may be provided in the intersections between grooves 121, 123 and a land barrier member 131 may be provided on top of each of central lands 127. Barrier members 129, 131 may be configured as described in connection with FIG. 2. Again, barriers 129, 131 have their longitudinal axes parallel or aligned with the central axis of screw 111 and thus extend transversely across the channel.

In the embodiment depicted in FIG. 1, the overall length of screw 11 is 88.13 inches, excluding the mounting portion. There is a single continuous flight 13 with an outer diameter of 3.492 inch and a width at the outer diameter of 0.375 inch. The lead (linear distance to complete one revolution) of flight 13 is 3.5 inch. In the feed section, the channel depth is 0.515 inch and the feed section is 31.5 inches in length. In the transition section, the channel depth tapers linearly from 0.515 inch to 0.200 inch over a length of 21 inches. The final, metering section is 16.25 inches long and the channel depth remains 0.200 inch over the length, except as noted below.

In the single-groove embodiment of FIG. 2, groove 21 is 0.300 inch deep and 1.5 inches wide, while in the two-groove embodiment of FIG. 3, grooves 121, 123 are 0.505 inch deep and 0.750 inch wide. Barriers 25, 27, 129, 131 in both embodiments are 1.05 inch long and 0.313 inch wide. Their projection above the tops of lands 23, 127 may be adjusted or varied to accommodate various polymer resin formulations and characteristics and to achieve the desired mixing characteristics.

In operation, screw 11, 111 is rotated within barrel 3 and pellets of plastic or polymer resin are fed into barrel 3 from hopper 7. As screw 11, 111 rotates, flight 13, 113 pushes or conveys the pellets along the length of the screw and barrel. Heat from barrel 3, friction, and shear forces applied to the pellets causes them to melt and mix, with the object to obtain a fully melted and thoroughly mixed viscous liquid at the discharge end of apparatus 1.

In the usual case, as the melting resin (still a mixture of unmelted or partially melted pellets and fully melted resin) approaches the metering section (the final about ⅓ of the screw length), there is a relatively narrow band of unmelted pellets against the trailing turns of the flight, while the remainder of the resin in the channel between the pushing and trailing turns is melted resin.

In the screw of the present invention, this mixture enters the grooves 21, 121, 123 and is forced to change direction as it moves along the channel between the pushing and trailing turns of flight 13, 113. This increases distributive mixing of the melted and unmelted resin. Further, the mixture is forced over and around barriers or dams 25, 27, 129, 131 and therefore over lands 23, 25, which causes dispersive mixing. By adjusting the projection of barriers 25, 27, 129, 131, the relative amounts of distributive mixing (resulting from decreased projection) and dispersive mixing (resulting from increased projection), can be adjusted to accommodate varying polymer formulations.

For example, to promote maximum distributive mixing, barriers 25, 131 atop lands 23, 127 project 0.100 inch above the top of the land. Barriers 27, 129 in grooves 21, 121, 123 are flush with the bottom of the groove in this configuration. To promote maximum dispersive mixing, barriers 25, 131 atop lands 23, 127 are flush, while barriers 27, 129 in grooves 21, 121, 123 are project 0.100 or more from the bottom of the groove. The relative degree of dispersive and distributive mixing can thereby be adjusted as needed. Thus, the invention provides a screw with wide versatility, approaching the true "all-purpose" screw.

The invention is disclosed with reference to preferred embodiments thereof. It is thus not limited, but is susceptible to variation and modification without departing from the scope and spirit of the invention.

I claim:

1. An improved screw for melting and mixing plastics, the screw rotating in a barrel, the screw comprising:
    a shaft having a surface and a central axis;
    at least one flight extending helically along the surface of the shaft in successive turns;
    a channel defined between a pushing turn of the flight and a trailing turn of the flight;
    a continuous groove formed in the channel in the surface of the shaft, the groove extending between the pushing and trailing turns of the flight at a selected angle greater than zero relative to the axis of the shaft in alternating generally opposing directions, the groove extending continuously and circumferentially over the surface of the shaft for at least one turn of the flight about the shaft; and
    at least a pair of generally triangular lands formed in the channel by the groove, one of the pair of lands having a base intersecting the pushing turn of the flight and another of the pair of lands having a base intersecting the trailing turn of the flight, each of the lands having an apex projecting into the groove, the lands having an upper surface that is raised relative to a lower surface of the groove.

2. The improved screw according to claim 1 further comprising a generally oblong barrier member disposed on one of the lands and the groove in general alignment with the apex of the land.

3. The improved screw according to claim 2, wherein the barrier member is disposed on and projects above the land.

4. The improved screw according to claim 2, wherein the barrier member is disposed in and projects into the groove.

5. The improved screw according to claim 1, wherein a pair of barrier members is associated with each land, one of the pair of barrier members disposed on each of the lands and another of the pair of barrier members in the groove, each of the pair of barrier members aligned with one another and with the apex of the land.

6. The improved screw according to claim 5, wherein the pair of barrier members are removable and adjustable in projection above the land and groove, respectively.

7. The improved screw according to claim 1, further comprising:
    a second continuous groove formed in the channel in surface of the shaft, the second groove intersecting the other groove to define central lands in the channel.

8. The improved screw according to claim 1, wherein the selected angle is 45 degrees.

9. An improved screw for melting and mixing plastics, the screw rotating in a barrel, the screw comprising:
    a shaft having a surface and a central axis;
    at least one flight extending helically along the surface of the shaft in successive turns;
    a continuous groove formed in the surface of the shaft, the groove extending between successive turns of the flight in a zigzag pattern, the groove defining a plurality of lands between successive turns of the flight, the groove being recessed relative to the lands and extending continuously and circumferentially over the surface of the shaft for at least one turn of the flight about the shaft;
    a generally oblong land barrier member disposed on each land; and
    a generally oblong groove barrier member disposed in the groove in general alignment with the land.

10. The improved screw according to claim 9, wherein each of the land barrier members projects above the land.

11. The improved screw according to claim 9, wherein each of the groove barrier members projects into the groove.

12. The improved screw according to claim 9, wherein the land and groove barrier members are aligned by their longitudinal axes.

13. The improved screw according to claim 9, wherein the land and groove barrier members are removable and adjustable in projection above the land and groove, respectively.

14. The improved screw according to claim 9, wherein each land is generally triangular and has a base aligned with and abutting an upstream turn of the flight and an apex between the upstream turn and a downstream turn of the flight.

15. An improved screw for melting and mixing plastics, the screw rotating in a barrel, the screw comprising:
    a shaft having a surface and a central axis;
    at least one flight extending helically along the surface of the shaft in successive turns;
    a channel defined between a pushing turn of the flight and a trailing turn of the flight;
    a first continuous groove formed in the channel in the surface of the shaft, the groove extending between the pushing and trailing turns of the flight at a selected angle greater than zero relative to the axis of of the shaft in alternating generally opposing directions;
    a second continuous groove formed in the channel in surface of the shaft, the groove extending between the pushing and trailing turns of the flight at a selected angle greater than zero relative to the axis of of the shaft in alternating generally opposing directions and intersecting the first groove, both the first and second grooves extending continuously and circumferentially over the surface of the shaft for at least one turn of the flight about the shaft;
    a plurality of generally triangular lands formed in the channel by the first and second grooves, each of the lands having an apex projecting into the groove; and
    a plurality of central lands formed in the channel by the intersection of the first and second grooves, each of the triangular lands and the central lands having an upper surface that is raised relative to a lower surface of the groove.

16. The improved screw according to claim 15 further comprising a generally oblong barrier member disposed on one of the central lands and the groove in general alignment with the central axis of the shaft.

17. The improved screw according to claim 15, wherein the barrier member is disposed on and projects above the central land.

18. The improved screw according to claim 15, wherein the barrier member is disposed in and projects into the groove.

19. The improved screw according to claim 15, further comprising a land barrier member disposed on and projecting above each central land and a groove barrier member disposed in and projecting into each of the grooves.

* * * * *